3,411,359
OVEN CONTROL MEANS AND PARTS THEREFOR
OR THE LIKE
Henry F. Hild and Siegfried E. Manecke, Indiana, Pa.,
assignors to Robertshaw Controls Company, Richmond,
Va., a corporation of Delaware
Filed Mar. 7, 1966, Ser. No. 532,464
4 Claims. (Cl. 73—362.3)

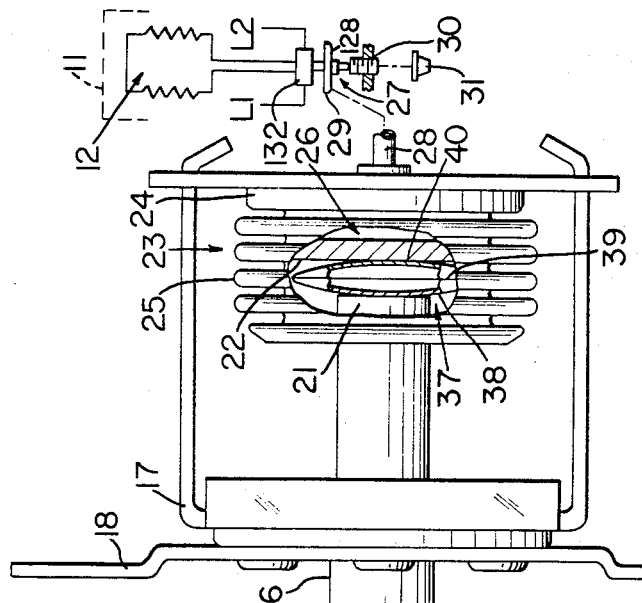
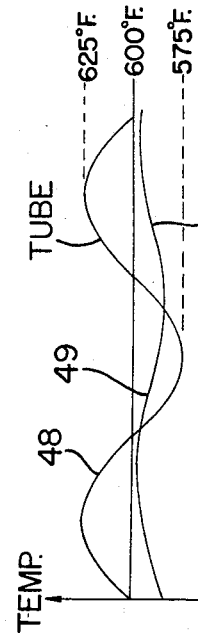
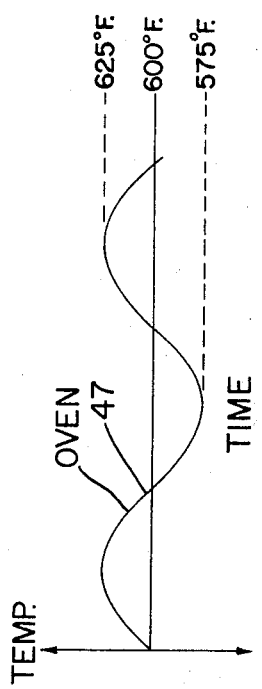
INVENTORS
HENRY F. HILD
SIEGFRIED E. MANECKE
THEIR ATTORNEYS

United States Patent Office
3,411,359
Patented Nov. 19, 1968

ABSTRACT OF THE DISCLOSURE

This disclosure relates to a rod and tube temperature sensing unit for an oven that has the rod thereof formed of a material having a substantially linear rate of expansion and contraction whose coefficient is less than the coefficient of expansion and contraction of the associated tube means with the rod means and tube means being so constructed and arranged that the unit is adapted to turn off the heating means before the temperature of the rod means can increase to the selected temperature for the oven and is adapted to turn on the heating means before the temperature of the rod means can be decreased to the lowest temperature that the oven reaches whereby the unit is adapted to provide a relatively narrow temperature differential in the oven as the temperature of the rod means will never reach the selected temperature during the selected temperature cooking operation.

---

This invention relates to improved means for accurately controlling the operation of a cooking apparatus or the like throughout a wide temperature range thereof as well as to improve parts for such a control means or the like.

It has been found according to the teachings of this invention that when a rod and tube temperature sensing unit is utilized to control the operation of a heating means of a cooking apparatus or the like wherein the desired temperature range of the cooking apparatus is relatively wide, the rod and tube unit will not provide accurate temperature sensing control means throughout the entire temperature range of the unit. Further, when the rod and tube unit is not only being utilized to control the operation of the cooking apparatus during the wide normal cooking temperature range thereof, but also for a relatively high temperature burn-off cleaning operation thereof, the rod and tube unit is not satisfactory because of the inaccuracy thereof throughout such a wide temperature range from the low temperature of the cooking operation to the high temperature of the cleaning operation.

Accordingly, this invention provides a rod and tube unit which will accurately sense and control the temperature of a cooking apparatus throughout the entire temperature range thereof, even though the cooking temperature range of the cooking apparatus is relatively wide. Also, one embodiment of the tube and rod unit of this invention will accurately control the cooking apparatus from the low cooking tempertaure thereof throughout a temperature range which includes a high temperature for burn-off cleaning operation of the cooking apparatus.

Accordingly, it is an object of this invention to provide an improved control means for a cooking apparatus or the like, the control means of this invention having one or more of the novel features set forth above or hereinafter shown or described.

Another object of this invention is to provide an improved rod and tube temperature sensing unit for such a control means or the like, the rod and tube unit of this invention having one or more of the novel features set forth above or hereinafter shown or described.

In particular, the rod and tube temperature sensing unit of this invention is so constructed and arranged that the rod means of the unit will have a substantially linear rate of expansion and contraction throughout the entire temperature range of the cooking apparatus or the like. Further, the temperature sensing rod and tube unit of this invention is so constructed and arranged that the same will provide a relatively narrow temperature differential in the cooking apparatus at a particular temperature setting for the cooking apparatus.

Other objects, uses and advantages of this invention are apparent from the reading of this description which proceeds with reference to the accompanying drawings forming a part thereof and wherein:

FIGURE 1 is a schematic view illustrating the improved temperature sensing rod and tube unit of this invention operating the control means of a cooking apparatus or the like.

FIGURE 2 is a graph of the narrow temperature differential produced in the cooking apparatus of FIGURE 1 by the temperature sensing rod and tube unit of this invention.

FIGURE 3 is a graph plotting the temperature of the tube means of the unit of FIGURE 1 in relation to the temperature of the rod means of the unit of FIGURE 1 during a particular temperature setting of the cooking apparatus of FIGURE 1.

While the various features of this invention are hereinafter described and illustrated as being particularly adaptable for controlling an electrical heating means of a cooking apparatus or the like, it is to be understood that the various features of this invention can be utilized singly or in any combination thereof to provide means for controlling other types of heating means for other types of apparatus.

Therefore, this invention is not to be limited to only the embodiment illustrated in the drawings, because the drawings are merely utilized to illustrate one of the wide variety of uses of this invention.

Referring now to FIGURE 1, a conventional cooking apparatus is schematically illustrated in FIGURE 1 and as generally indicated by the reference numeral 10, the cooking apparatus 10 including an oven 11 having electrical hea.ing means 12 controlled by a temperature sensing rod and tube unit of this invention generally indicated by the reference numeral 13 in FIGURE 1.

The unit 13 of this invention includes a tube means 14 having opposed ends 15 and 16, the end 16 being fixed to a frame means 17 adapted to be secured to a rear wall of the apparatus 10 by mounting bracket means 18.

A rod means 19 is disposed in the tube means 14 and has opposed ends 20 and 21, the end 20 as the rod means 19 being fixed to the end means 15 of the tube means 14 to move in unison therewith while the end 21 of the rod means 19 projects out of the open end 16 of the tube means 14 to operatively engage a movable wall 22 of a chamber defining means 23.

The chamber defining means 23 includes a fixed wall 24 secured from movement to the frame means 17 and interconnected to the cup-shaped rigid, movable wall 22 by a bellows member 25 whereby a pneumatic fluid containing chamber 26 is defined in the chamber defining means 25. The chamber 26 is interconnected to a chamber of another chamber defining means 27 by a conduit means 28, the chamber defining means 27 having a fixed wall 128 and a movable wall 29.

The fixed wall 128 of the chamber defining means 27 is adapted to be adjusted relative to a frame means 30 of the apparatus 10 by a manually operated selector knob 31 in a manner conventional in the art. The movable wall 29 of the chamber defining means 27 is adapted to open and close an electrical switch 132 for a purpose hereinafter described, the switch 132 when closed placing the heater means 12 across the power source leads L1 and L2 for a heating operation of the oven 11 and when opened to disconnect the heater means 12 from the power leads L1 and L2 to effect a cooling operation of the oven 11.

The rod means 19 includes a member 32 disposed in the end 15 of the tube means 14 and secured thereto by having an annular bead 33 of the tube means 14 deformed into an annular recess 34 provided in the outer peripheral surface of the member 32. In addition, the member 32 can be further secured to the end 15 of the tube means 14 by braising 35.

Another member 36 forming a part of the rod means 19 is disposed in sliding contact with the internal peripheral surface of the tube means 14 at the end 16 thereof, the member 36 providing the end 21 of the rod means 19 and being operatively interconnected to the movable wall 22 of the chamber defining means 23 by an interposed ambient temperature compensating means 37 disposed in the cup-shaped movable wall 22.

The ambient temperature compensating means 37 comprises a pair of like cup-shaped bi-metallic discs 38 respectively having the open ends 39 thereof disposed in abutting relation with opposed ends 40 respectively engaging the end 21 of the rod means 19 and the movable wall 22 of the chamber defining means 23.

The members 32 and 36 of the rod means 19 respectively have facing closed bores 41 and 42 receiving the opposed ends 43 and 44 of a remaining part or member 45 of the rod means 19.

The member 45 has cross-sectional dimension substantially smaller than the cross-sectional dimension of the tube means 14 and is held out of sliding contact therewith by the parts 32 and 36 and is held in assembled compacted relation therewith by the natural tendency of the bellows member 25 to push the movable wall 22 to the right in FIGURE 1 regardless of the temperature being sensed by the unit 13 in the oven 11.

In general, the tube means 14 of the unit 13 is formed of a material having a larger coefficient of thermal expansion and contraction than the coefficient of thermal expansion and contraction of the rod means 19 whereby when the unit 13 senses an increase in temperature in the oven 11, the end 15 of the tube means 14 elongates to the left in FIGURE 1 and the end means 21 of the rod means 19 also moves to the left to increase the volumetric capacity of the chamber 26 of the chamber defining means 23. As the volume of the chamber 26 of the chamber defining means 23 increases, pneumatic fluid is drawn from the chamber of the chamber defining means 27 to cause the movable wall 29 thereof to move in a downward direction in FIGURE 1 whereby when the movable wall 29 has moved downwardly in FIGURE 1 a distance selected by the selector knob 31, the switch 132 is opened to terminate the heating operation of the heating means 12. Conversely, when the unit 13 senses a decrease in the temperature in the oven 11, the end 15 of the tube means 14 contracts to the right in FIGURE 1 to cause movement of the end 21 of the tube means 19 to the right to collapse the chamber defining means 23 in a manner to reduce the volumetric capacity thereof.

As the volume of the chamber 26 of the chamber defining means 23 decreases upon the decrease in temperature sensed by the unit 13, pneumatic fluid is forced from the chamber 26 into the chamber of the chamber defining means 27 to cause the movable wall 29 thereof to move upwardly in FIGURE 1. When the wall 29 has moved upwardly to a predetermined position as set by the control knob 31, the switch means 132 is closed by the movable wall 29 to again interconnect the power source leads L1 and L2 to the heater means 12 to complete a heating operation of the oven 11.

In this manner, the control knob 31 can be utilized to set a desired temperature for the oven 11 and the unit 13 of this invention will maintain the oven 11 substantially at the selected temperature by cycling the heating means 12 on and off in the above manner.

As previously stated, certain conventional rod and tube arrangements are not satisfactory for accurate control of conventional cooking apparatus such as the apparatus 10 in FIGURE 1, because the normal cooking temperature range thereof is relatively wide, such as from 200° F. to 600° F., and the linear rate of expansion and contraction of the parts of the unit is not linear over the entire temperature range.

Further, such conventional rod and tube units are so constructed and arranged that the same provide a relatively wide temperature differential at a particular temperature setting for the cooking apparatus whereby the temperature of the oven will be cycled well above the selected temperature as well as below the same during a cooking operation.

However, the rod and tube temperature sensing unit 13 of this invention are so constructed and arranged in a manner hereinafter described that the above deficiencies of the conventional rod and tube units are substantially eliminated.

In particular, the tube means 14 of unit 13 of this invention as well as the members 32 and 36 of the rod means 19 are formed from stainless steel of the type comprising approximately 18% chromium and approximately 8% nickel. The member 36 of the rod means 19 is formed of a length so that the end 36 thereof will be substantially coplanar with the inner surface of the oven 11 so that the rod means 19 and tube means 14 have the same coefficient of expansion and contraction on the parts thereof disposed outside the inner surface of oven 11 whereby outside temperature variations will be fully compensated for and not affect the accurate temperature sensing of the unit 13.

In addition, the ambient temperature compensating means 37 is so constructed and arranged that an increase in ambient temperature outside the oven 11 adjacent the chamber defining means 23, will cause the members 38 to collapse toward each other so that corresponding expansion of the fluid in the chamber 26 by the increase in ambient temperature can take place without a change in the position of the movable wall 29 of the chamber defining means 27. Conversely, should the ambient temperature outside the oven 11 adjacent the chamber defining means 23 decrease, the members 38 tend to further bow to compensate for the contraction of the pneumatic fluid in the chamber 26 by the decrease in temperature thereof so that the position of the movable wall 29 of the chamber defining means 27 will remain constant during such ambient temperature decrease.

The rod like part 45 of the rod means 19 is formed from a material having a coefficient of thermal expansion and contraction smaller than the coefficient of thermal expansion of the tube means 14 and has a rate of expansion and contraction that is substantially linear throughout the entire temperature range of the oven 11 as set by the selector knob 31.

For example, in the embodiment of FIGURE 1, wherein the temperature range of the oven 11 is only for cooking purposes so that the cooking range temperature range is from approximately 200° F. to 600° F., the member 45 is formed from a metallic alloy comprising approximately 41% nickel with the balance thereof being iron. Such a metallic alloy is sold under the designation No. 142 Nickel Alloy by Driver-Harris Company of Harrison, N.J.

Should the unit 13 of this invention be utilized in the apparatus 10 for not only controlling the heating means 12 during the above described cooking operation of the oven 11, but also for a relatively high temperature setting of the knob 31 for an oven burn off cleaning operation, such as around 900° F., the member 45 can comprise a metallic alloy of approximately 28½% to 29½% nickel, approximately 16½% to 17½% copper and the balance iron. Such a metallic alloy is sold under the designation "Therlo" by the Driver-Harris Company of Harrison, N.J.

The above two types of material for forming the member 45 of the rod means 19 of the unit 13 provide a substantially linear rate of expansion and contraction of the rod means 19 during the above described temperature ranges of the oven 11 and respectively provide a relatively low temperature differential at any temperature setting of the control knob 31 for the particular temperature range of the oven 11.

For example, reference is now made to FIGURE 2 wherein the cooking apparatus 10 has been set to maintain a temperature of 600° F. in the oven 11. The temperature differential in the oven 11 for the 600° F. setting of the control knob 31 is represented by the line 47. The rod means 19 and tube means 14 of the unit 13 provide the narrow temperature differential as illustrated in FIGURE 2 wherein the maximum temperature differential is only 50° F., i.e., from a maximum of 25° F. above the temperature setting to a maximum of 25° F. below the temperature setting.

Such a small temperature differential as illustrated in FIGURE 2 is believed to be caused not only by the substantially linear rate of expansion and contraction of the rod means 19 of the unit 13, but also by the fact that the rod means 19 heats and cools at a slower rate than the rate that the tube means 14 heats and cools whereby a time lag occurs in the heating and cooling of the rod means 19 in relation to the heating and cooling of the tube means 14.

For example, reference is now made to the graph of FIGURE 3 wherein the line 48 represents the temperature of the tube means 14 for the previously described 600° F. setting of the control knob 132 and the line 49 represents the temperature of the rod means 19 for the 600° F. setting of the control knob 31. The rod and tube means 19 and 14 are so constructed and arranged in the manner previously described that the switch 32 opens and closes to cause the heating operation of the oven 11 to affect heating of the tube means 14 so that when the same reaches its peak temperature, the temperature of the rod means 19 is still increasing in a time lag therewith and conversely when the tube means 14 reaches its lowest temperature, the temperature of the rod means 19 is still decreasing.

Therefore, it has been found that such a construction of the rod and tube unit 13 of this invention not only provides an accurate control during the entire temperature range of the oven 11, but also the same provides a relatively small temperature differential at any particular temperature setting for the oven 11.

Accordingly, not only does this invention provide an improved control means for a cooking apparatus or the like, but also this invention provides an improved temperature sensing rod and tube arrangement therefor or the like.

While the form of the invention now preferred has been disclosed as required by statute, other forms may be used, all coming within the scope of the claimed subject matter which follows.

What is claimed is:

1. A temperature sensing rod and tube unit comprising a tube means having opposed end means, and a rod means disposed in said tube means and having opposed end means, one of said end means of said rod means being operatively interconnected to one of said end means of said tube means to move in unison therewith, said tube means being formed of material having a first coefficient of thermal expansion and contraction, said rod means having at least a part thereof formed of a material having a second coefficient of thermal expansion and contraction which is a smaller coefficient than said first coefficient, said material of said part of said rod means providing a substantially linear rate of expansion and contraction thereof throughout an entire normal cooking temperature range of a cooking apparatus or the like, said material of said part of said rod means being a metallic alloy comprising approximately 41% nickel and the remainder iron, said tube means being formed of stainless steel.

2. A temperature sensing rod and tube unit comprising a tube means having opposed end means, and a rod means disposed in said tube means and having opposed end means, one of said end means of said rod means being operatively interconnected to one of said end means of said tube means to move in unison therewith, said tube means being formed of material having a first coefficient of thermal expansion and contraction, said rod means having at least a part thereof formed of a material having a second coefficient of thermal expansion and contraction which is a smaller coefficient than said first coefficient, said material of said part of said rod means providing a substantially linear rate of expansion and contraction thereof throughout an entire normal cooking temperature range of a cooking apparatus or the like, said material of said part of said rod means being a metallic alloy comprising approximately 28½% to 29½% nickel, approximately 16½% to 17½% copper and the remainder iron, said tube means is formed of stainless steel.

3. In a cooking apparatus having an oven provided with a heating means therefor, the improvement comprising a rod and tube unit for sensing the temperature of said oven, and control means operatively interconnected to said unit and to said heating means to turn on said heating means to heat said oven when said unit senses a temperature in said oven below a temperature selected by said control means and to turn off said heating means to cool said oven when said unit senses a temperature in said oven above said selected temperature, said unit having a tube means provided with opposed end means, said unit having a rod means disposed in said tube means and provided with opposed end means, one of said end means of said rod means being operatively interconnected to one of said end means of said tube means to move in unison therewith, said tube means being formed of material having a first coefficient of thermal expansion and contraction, said rod means having at least a part thereof formed of a material having a second coefficient of thermal expansion and contraction which is a smaller coefficient than said first coefficient, said material of said part of said rod means providing a substantially linear rate of expansion and contraction thereof throughout an entire normal cooking temperature range of said oven as selected by said control means, said material of said part of said rod means being a metallic alloy comprising approximately 41% nickel and the remainder iron, said tube means being formed of stainless steel.

4. In a cooking apparatus having an oven provided with a heating means therefor, the improvement comprising a rod and tube unit for sensing the temperature of said oven, and control means operatively interconnected to said unit and to said heating means to turn on said heating means to heat said oven when said unit senses a temperature in said oven below a temperature selected by said control means and to turn off said heating means to cool said oven when said unit senses a temperature in said oven above said selected temperature, said unit having a tube means provided with opposed end means, said unit having a rod means disposed in said tube means and provided with opposed end means, one of said end means of said rod means being operatively interconnected to one of said end means of said tube means to move in unison therewith, said tube means being formed of material having a first coefficient of thermal expansion and contraction, said rod means having at least a part thereof formed of a material having a second coefficient of thermal expansion and contraction which is a smaller coefficient than said first coefficient, said material of said part of said rod means providing a substantially linear rate of expansion and contraction thereof throughout an entire normal cooking temperature range of said oven as selected by said control means, said material of said part of said rod means being a metallic alloy comprising approximately 28½% to 29½% nickel, approximately 16½% to 17½% copper and the remainder iron, said tube means being formed of stainless steel.

References Cited
UNITED STATES PATENTS

| | | | |
|---|---|---|---|
| 1,925,297 | 9/1933 | Brennen | 73—362.3 |
| 1,945,706 | 2/1934 | Satchwell | 73—363.1 |
| 2,403,895 | 7/1946 | Alban et al. | 73—362.3 |
| 2,448,784 | 9/1948 | Dickinson | 73—362.3 |

S. CLEMENT SWISHER, *Acting Primary Examiner.*

J. W. ROSKOS, *Assistant Examiner.*